United States Patent Office 3,238,350
Patented Mar. 1, 1966

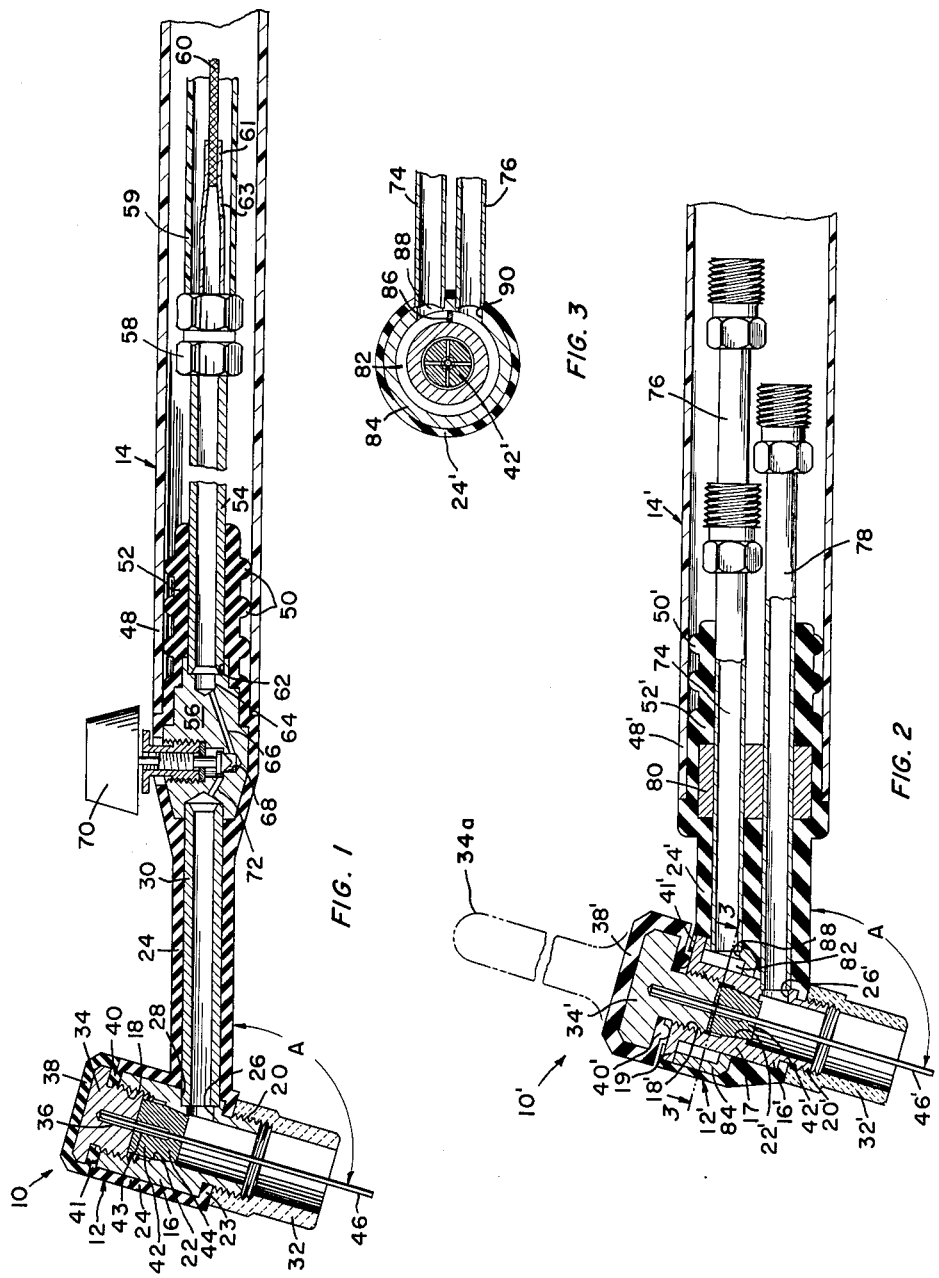

3,238,350
WELDING TORCH
George A. Klasson, South Whitehall Township, Lehigh County, Justin W. Mills, Macungie, and Robert F. Thomas, Forks Township, Northampton County, Pa., assignors to Air Products and Chemicals, Inc., a corporation of Delaware
Filed Apr. 20, 1964, Ser. No. 360,993
9 Claims. (Cl. 219—75)

The present invention relates to a welding torch of the tungsten electrode and inert gas type hereinafter referred to as a "TIG" torch.

TIG torches are well known in the art and generally include tungsten electrodes which are commonly referred to as being of the "non-consumable" type. In practice, however, these electrodes are gradually consumed so that it is necessary to provide some type of adjustable securing means whereby the position of the electrode may be varied at infrequent intervals. In the past, gripping means such as collets have been employed to hold the tungsten electrode in position and various threaded mechanisms have been used to tighten or loosen the grip of the collet. However, it has been general practice to introduce the shielding gas to the torch barrel at a point above the collet, i.e., remote from the nozzle, and this requires special passages to enable the gas to flow around or through the collet to the nozzle. The provision of such passages is objectionable since they either increase the size of the torch or weaken the torch components. In addition, such passages increase manufacturing costs and generally restrict and disrupt the efficient flow of shielding gas to the nozzle.

It is therefore one principal object of the present invention to provide a welding torch wherein the shielding gas is admitted to the barrel at a point between the torch nozzle and the collet such that no gas passages are required in the collet or in the collet-adjusting mechanism, the latter of which is positioned on the opposite side of the collet remote from the nozzle.

It is another principal object of the present invention to provide a welding torch having simplified and more efficient water cooling and gas sealing structure whereby the size, weight, and manufacturing cost of the torch are all substantially reduced.

It is yet another object of the present invention to provide a welding torch having an improved conductive path between the power source and the welding electrode.

Finally, it is the general object of the present invention to provide a substantially improved welding torch of the TIG type having various specific advantages of construction and operation which will become more fully apparent from the following description when taken with the accompanying drawings, in which:

FIGURE 1 is an enlarged, sectional view of a TIG torch illustrating one embodiment of the present invention;

FIGURE 2 is an enlarged, sectional view of a TIG torch illustrating a second, water-cooled embodiment of the present invention; and FIGURE 3 is a sectional view taken along the plane indicated by line 3—3 of FIGURE 2.

Referring first to FIGURE 1, torch 10 includes a barrel portion generally designated by numeral 12 and a handle portion generally designated by numeral 14. These portions are joined to form an included angle A which may range from 30° to 135°; an angle of approximately 105° being shown for purposes of illustration. Barrel portion 12 includes an integral body 16 the upper end of which is internally threaded at 18 and the lower end of which is externally threaded at 20. Intermediate threads 18 and 20, body 16 is provided with a tapered, internal surface 22. Immediately below tapered surface 22, body 16 is provided with a port 26 aligned with a bore 28 the latter of which receives and is rigidly connected to a gas and current supply tube 30. The exterior surfaces of body 16 and tube 30 are covered with an integral, molded insulating cover 24 which may be composed of hard rubber, plastic, or the like.

Threads 20 are adpated to receive and secure a ceramic nozzle 32 the upper end of which seats tightly against a lip portion 23 of insulation material 24. Alternatively, nozzle 32 may be metallic if suitably insulated from body 16. At the opposite end of the torch body, threads 18 are adapted to receive a cap 34 having a longitudinal bore 36 aligned with the center-line of body 16 and nozzle 32. Cap 34 is surrounded by a molded insulating cover 38 which extends over and under the cap terminating in an annular bead 40 the latter of which is adapted to seal against the upper, annular surface of body 16. It will also be noted that the insulating cover 24 extends over the upper, peripheral edge of body 16 to form a lip portion 41 which is adapted to engage the lower surface of cap cover 38 so as to form a secondary seal. Although a short cap 34 is illustrated in full line in FIGURE 1, it is to be understood that an elongated cap 34a may be employed for accommodating long electrodes as shown in dotted line in FIGURE 2.

A chuck or collet 42 having a central aperture 43 and a plurality of flexible arm portions 44 is received in seated engagement with tapered surface 22. In this position, the lower end of cap 34 is adapted to engage the upper surface of the collet and force the collet downwardly thereby wedging the collet arms 44 radially inwardly into tight gripping engagement with the tungsten electrode 46. Of course, interchangeable collets of varying size may be employed for electrodes of various diameters.

Handle portion 14 of torch 10 includes a cylindrical sleeve 48 composed of hard rubber, plastic, or the like, which slides over and is frictionally engaged by a plurality of ridges 50 formed in an extension 52 of insulation 24. Extension portion 52 is molded about a gas and current supply conduit 54 as well as a valve body 56. At the right-hand end, conduit 54 carries a conventional hose coupling 58 by means of which the torch may be connected to a flexible hose 59 leading to a source of suitable shielding gas. For example, a power cable 60 is inserted into one end of a tube 61 and the tube is crimped about the cable. One or more ports 63 are provided in tube 61 for the passage of shielding gas from hose 59 to conduit 54.

The left-hand end of conduit 54 is received in a counterbore 62 provided in valve body 56. The valve body is further provided with an aligned bore 64 and a passage 66 the latter of which communicates with a valve bore 68. Valve bore 68 receives a threaded needle valve 70 which controls the volume of shielding gas passing through valve outlet passage 72 into supply tube 30.

From the foregoing description of the torch structure it will be apparent that shielding gas and welding current are conveyed from suitable sources not shown through conduit 54, valve body 56 and tube 30 to the torch body 16. The gas then passes unobstructed through port 26 into the barrel where it surrounds electrode 46 and passes externally of the torch through nozzle 32 to surround the weld puddle. At the same time, the welding current is conducted from the end of tube 30, through an extremely short section of body 16 to collet 42 and the electrode which is tightly engaged thereby. It will therefore be apparent that exceptionally direct and unobstructed passages are provided for both current and shielding gas so that maximum efficiency is obtained. In addition, it will be noted that the position of the electrode is easily adjusted from the rear end of the torch merely by loosening cap 34. It will also be apparent that the integral insulation 24 forms sealing functions at lips 23, 41 as well as facilitating assembly and disassembly of the handle sleeve 48 by reason of ridges 50. In addition, the over-all result of the above described structure enables a substantial reduction in the size and weight of the torch so that it may be used in applications requiring miniaturized equipment. For example the above described torch has been made with head size measuring one and one-eighth inches from nozzle tip to back cap and an external diameter of seven-sixteenth inch which is smaller than any other known torch of comparable power rating.

Reference is now made to FIGURE 2 which illustrates a modified embodiment of the invention including water-cooling structure as required for heavy-duty operation. In general, this embodiment is identical to that previously described and the like parts are indicated by primed numerals corresponding to their FIGURE 1 counterparts.

Referring first to handle portion 14', sleeve 48' surrounds two water conduits 74 and 76 in addition to a gas conduit 78; each one of the conduits having a conventional hose coupling for connection to suitable gas and water sources not shown. In operation, water conduit 74 serves as the return conduit leading from the torch head 12' and this conduit receives the terminal end of an electrical power cable as in the foregoing embodiment. Conduits 74, 76 and 78 pass through a support block 80 and it will be noted that the external surface of the block and the conduits are encased in an insulating cover 24' having friction gripping ridges 50' as in the previous embodiment.

The head portion 12' includes a body 16' having a cylindrical portion 17 and an annular flange 19. Portion 17 is externally threaded at 20' for the reception of a ceramic nozzle 32' and internally threaded at 18' for the reception of a cap 34'. The cap is covered with an insulating cover 38' having a bead 40' forming a first seal at the rear end of the torch head. Second and third seals are provided by lip portions 41' and 23' as in the first embodiment.

The torch body 16' includes an internal, tapered portion 22' against which is seated a collet 42' for holding the electrode 46' in adjusted position. Thus, the torch shown in FIGURE 2 includes all of the features described hereinabove in greater detail with reference to FIGURE 1. In addition, the FIGURE 2 embodiment includes an annular cooling chamber 82 formed by a cup-shaped element 84 which is permanently secured to portion 17 and flange 19 of body 16' as, for example, by welding. As shown in FIGURE 3, chamber 82 is partitioned by a wall 86 positioned between ports 88 and 90 so that the flow of coolant is from conduit 76, through port 90 around chamber 82 and out through port 88 and return conduit 74. In this manner, the coolant is rapidly circulated about substantially the full axial length of threads 18' and the portion of body 16' which is adjacent to collet 42'. Thus, both the cap 34' and the torch body portion are efficiently cooled without the need of elaborate flow passages in the barrel which are expensive to manufacture and subject to clogging due to accumulation of calcium deposits from the water. In addition, it will be noted that the shielding gas does not pass through the collet, but rather, the gas flows unobstructed through port 26' directly into nozzle 32'. It will also be noted that cup-shaped element 84 forms a short and direct current path from conduit 74 to that portion of body 16' immediately adjacent surface 22' which grips the collet. Thus, the gas coolant, and current passages provide for maximum energy transfer within a substantially shorter and more compact torch head than has been heretofore possible.

From the foregoing description it will be apparent that the illustrated embodiments of the present invention accomplish all of the recited objects while, at the same time, it will be apparent that numerous modifications are possible within the scope of the invention. Therefore, it is to be understood that the foregoing description is purely illustrative of the invention and that the latter is not to be limited other than as set forth in the following claims.

What is claimed is:

1. A hand-operated welding torch including a handle and a hollow barrel joined at an angle, a nozzle secured to said barrel, said barrel having a tapered internal surface, an elongated electrode of solid cross-section, adjustable collet means engaging said internal tapered surface and securing said electrode in an adjustable axial position centrally of said nozzle, and conduit means extending through said handle and communicating with said hollow barrel at a point between said nozzle and said tapered surface for supplying shielding gas to surround said electrode.

2. A hand-operated welding torch including a handle and a hollow barrel joined at an angle, means forming a cooling chamber surrounding at least a portion of said barrel, a nozzle secured to said barrel, said barrel having a tapered internal surface, an elongated electrode of solid cross-section, adjustable collet means engaging said internal tapered surface and securing said electrode in an adjustable axial position centrally of said nozzle, first conduit means extending through said handle for supplying coolant to and from said cooling chamber, and second conduit means extending through said handle and communicating with said hollow barrel at a point between said nozzle and said tapered surface for supplying shielding gas to surround said electrode; said point being immediately adjacent the junction of said barrel and said handle.

3. A hand-operated welding torch including a handle and an elongated cylindrical barrel joined at an angle, a nozzle secured to one end of said barrel, a removable cap secured to the opposite end of said barrel, said barrel having a tapered internal surface intermediate said ends, a collet engaged by said cap and adapted to tightly engage said tapered surface when said cap is secured to said opposite end, an elongated electrode adjustably secured within said barrel by said collet, and conduit means extending through said handle and communicating with said hollow barrel at a point below said tapered internal surface for supplying shielding gas to surround said electrode.

4. In a welding torch including a substantially cylindrical barrel, an insulating cover surrounding said barrel, said cover including a lip portion overlying one end of said cylindrical barrel, and a nozzle secured to said one end of said barrel in engagement with said lip portion whereby said lip portion forms a gas seal preventing the escape of shielding gas from passing between said barrel and said nozzle.

5. In a welding torch including a substantially cylindrical barrel, a nozzle secured to one end of said barrel, a cap secured to the opposite end of said barrel, and an insulating cover surrounding said cap, said cover including an integral beaded portion positioned between said cap and said one end of said barrel so as to form a seal therebetween.

6. A hand-operated welding torch including a barrel and a handle joined at an angle, an integral insulating cover surrounding said barrel and having a portion extending along said handle, said portion extending along said handle including a plurality of ridges, and a sleeve telescoped over said ridges and frictionally secured in position by said ridges.

7. A hand-operated welding torch including a handle and an elongated cylindrical barrel joined at an angle, a nozzle secured to one end of said barrel, a removable cap secured to the opposite end of said barrel, said barrel having a tapered internal surface intermediate said ends, means forming an annular cooling chamber surrounding said barrel at a point closely adjacent said internal tapered surface, a collet engaged by said cap and adapted to tightly engage said tapered surface when said cap is secured to said opposite end, an elongated electrode adjustably secured within said barrel by said collet, first conduit means extending through said handle for supplying coolant to and from said cooling chamber, and second conduit means extending through said handle and communicating with said cylindrical barrel at a point below said tapered surface for supplying shielding gas to surround said electrode.

8. A hand-operated welding torch including a handle and an elongated cylindrical barrel joined at an angle, a nozzle secured to one end of said barrel, a removable cap secured to the opposite end of said barrel, said barrel having a tapered internal surface intermediate said ends, means forming an annular cooling chamber surrounding said barrel at a point closely adjacent said internal tapered surface, a collet engaged by said cap and adapted to tightly engage said tapered surface when said cap is secured in said opposite end, an elongated electrode adjustably secured within said barrel by said collet, first conduit means extending through said handle for supplying coolant to and from said cooling chamber, second conduit means extending through said handle and communicating with said cylindrical barrel at a point below said tapered surface for supplying shielding gas to surround said electrode, and an electric power cable connected to first conduit means whereby said conduit means conduct welding current to said electrode through said cooling chamber means, said barrel, and said collet.

9. A hand-operated welding torch including a substantially cylindrical barrel and a handle joined at an angle, adjustable electrode gripping means positioned in said barrel, an elongated electrode adjustably secured by said griping means, a cap closing the upper end of said barrel and engaging said gripping means, a nozzle secured to the lower end of said barrel surrounding said electrode, said barrel having an externally extending flange near said upper end of said barrel, and a cup-shaped element secured to said flange and said barrel so as to form an annular cooling chamber surrounding the upper and mid-positions of said barrel.

References Cited by the Examiner
UNITED STATES PATENTS

| | | | |
|---|---|---|---|
| 2,274,631 | 2/1942 | Meredith | 219—75 |
| 2,310,164 | 2/1943 | Prendergast et al. | 219—75 |
| 2,686,860 | 8/1954 | Buck et al. | 219—75 |
| 2,922,868 | 1/1960 | Hackman et al. | 219—75 |
| 3,148,263 | 9/1964 | Jensen | 219—75 |

RICHARD M. WOOD, *Primary Examiner.*